(12) United States Patent
Ono

(10) Patent No.: US 9,151,458 B2
(45) Date of Patent: Oct. 6, 2015

(54) SOLAR PANEL DEVICE

(75) Inventor: Yoshiko Ono, Hyogo (JP)

(73) Assignee: NIHON ENERGY INSTITUTE CO., LTD., Toyotomi-Cho, Himeji-Shi, Hyogo (JP)

(*) Notice: Subject to any disclaimer, the term of this patent is extended or adjusted under 35 U.S.C. 154(b) by 111 days.

(21) Appl. No.: 14/116,069

(22) PCT Filed: Feb. 2, 2012

(86) PCT No.: PCT/JP2012/052380
§ 371 (c)(1),
(2), (4) Date: May 7, 2014

(87) PCT Pub. No.: WO2012/153550
PCT Pub. Date: Nov. 15, 2012

(65) Prior Publication Data
US 2014/0247583 A1  Sep. 4, 2014

(30) Foreign Application Priority Data

May 6, 2011 (JP) ................. 2011-103617

(51) Int. Cl.
*F21L 4/00* (2006.01)
*F21S 9/03* (2006.01)
(Continued)

(52) U.S. Cl.
CPC ............ *F21S 9/035* (2013.01); *F21K 9/175* (2013.01); *F21S 9/037* (2013.01); *F21V 7/005* (2013.01);
(Continued)

(58) Field of Classification Search
CPC ............ F21S 9/03; F21S 9/032; F21S 9/035; F21S 9/037; F21K 9/175; F21L 4/00
USPC ....................................... 362/183
See application file for complete search history.

(56) References Cited

U.S. PATENT DOCUMENTS 4,379,324 A * 4/1983 Thompson ............... 362/253
4,441,143 A * 4/1984 Richardson, Jr. ......... 362/183
(Continued)

FOREIGN PATENT DOCUMENTS

JO    2010-027212 A    2/2010
JP    3098693 U       3/2004
(Continued)

OTHER PUBLICATIONS

International Search Report. PCT/JP2012/052380. May 15, 2012, 4pgs.

*Primary Examiner* — Jong-Suk (James) Lee
*Assistant Examiner* — Bryon T Gyllstrom

(57) ABSTRACT

A solar panel device is provided which can be simply attached to an existing fluorescent lamp or LED lamp to construct a power-generating lamp.

A solar panel device includes a solar panel (11) that has an arc band shape in a cross-sectional view with an arc length in a range which is equal to or greater than ⅕ of an outer circumference of a lamp tube (14) in a cross-sectional view and equal to or less than ½ of the outer circumference in a width direction and that receives light from a rear surface of the lamp tube and generates an electromotive force, a power supply line (12) that outputs the electromotive force of the solar panel, and a tubular base (13) that has a tube shape, that has the solar panel attached to an inner surface or an outer surface thereof in a length direction, that is externally fitted to the lamp tube to cover the lamp tube, and that holds the solar panel so that a light-receiving surface of the solar panel comes in contact with the surface of the lamp tube or is located with a gap of 10 mm or less from the surface of the lamp tube.

8 Claims, 12 Drawing Sheets

(51) Int. Cl.
*H05B 35/00* (2006.01)
*F21V 7/00* (2006.01)
*H05B 33/08* (2006.01)
*H05B 41/42* (2006.01)
*H02S 30/20* (2014.01)
*F21K 99/00* (2010.01)
*F21V 17/04* (2006.01)
*F21Y 101/02* (2006.01)
*F21Y 103/00* (2006.01)
*H02J 9/00* (2006.01)

(52) U.S. Cl.
CPC ............ *H02S 30/20* (2013.01); *H05B 33/0809* (2013.01); *H05B 35/00* (2013.01); *H05B 41/42* (2013.01); *F21K 9/17* (2013.01); *F21V 17/04* (2013.01); *F21Y 2101/02* (2013.01); *F21Y 2103/00* (2013.01); *F21Y 2103/003* (2013.01); *H02J 9/00* (2013.01); *Y02B 10/10* (2013.01); *Y02E 10/542* (2013.01)

(56) References Cited

U.S. PATENT DOCUMENTS

| | | | |
|---|---|---|---|
| 4,782,432 A * | 11/1988 | Coffman | 362/184 |
| 7,611,260 B1 | 11/2009 | Lin et al. | |
| 7,976,196 B2 * | 7/2011 | Ivey et al. | 362/294 |
| 2002/0075674 A1 * | 6/2002 | Tufte | 362/223 |
| 2002/0131273 A1 * | 9/2002 | Tufte | 362/477 |
| 2002/0131275 A1 * | 9/2002 | Yamamoto et al. | 362/555 |
| 2002/0136017 A1 * | 9/2002 | Tufte | 362/477 |
| 2006/0274521 A1 * | 12/2006 | Ullrich | 362/159 |
| 2007/0223225 A1 | 9/2007 | Eiich et al. | |
| 2009/0196039 A1 | 8/2009 | Shyu et al. | |
| 2010/0328930 A1 * | 12/2010 | Wu et al. | 362/183 |
| 2013/0107510 A1 * | 5/2013 | Ono | 362/190 |

FOREIGN PATENT DOCUMENTS

| | | |
|---|---|---|
| JP | 2007-257928 A | 4/2007 |
| JP | 3146894 U | 12/2008 |
| JP | 2010-135206 A | 6/2010 |
| JP | 2011-070992 A | 4/2011 |
| WO | 2012-008194 A | 1/2012 |

* cited by examiner

SOLAR PANEL DEVICE

TECHNICAL FIELD

The present invention relates to a solar panel device, and more particularly, to a device which is simply attached to an existing fluorescent lamp or LED lamp to construct a power-generating lamp.

BACKGROUND ART

A technique has been proposed in which a solar panel is attached to a reflector which is provided on the rear side of a lamp tube of a fluorescent lamp appliance and receives light emitted from the fluorescent lamp tube, a capacitor or an rechargeable battery is charged be the electromotive force of a solar panel, and a voltage is applied from a capacitor or a rechargeable to an emergency light or a guidance light to turn on the emergency light or the guidance light when a switch of a fluorescent lamp appliance is turned off or when the fluorescent lamp appliance is turned off, thereby effectively using electric energy (PTL 1 and PTL 2).

With recent dramatic development in electronic technology, LEDs with low power consumption and high brightness has been put to practical use, and an LED lamp has been employed instead of a fluorescent lamp (PTL 3 and PTL 4).

CITATION LIST

Patent Literature

[PTL 1] Japanese Unexamined Patent Application Publication No. 2010-135206
[PTL 2] Japanese Registered Utility Model No. 3146894
[PTL 3] Japanese Unexamined Patent Application Publication No. 2007-257928
[PTL 4] Japanese Unexamined Patent Application Publication No. 2010-27212

SUMMARY OF THE INVENTION

Technical Problem

However, in the devices disclosed in PTL 1 and PTL 2, since a distance between the fluorescent lamp tube and the solar panel is equal to or greater than 15 mm. Therefore, even if a high-intensity fluorescent lamp tube is used and a solar panel with a large area is employed. Little practical electromotive force is obtained.

On the contrary, the applicant of the present application has proposed a power-generating lamp comprising; a linear or annular lamp tube that emits light by turn on the electricity; a solar panel that has an arc band-like shape in a cross-sectional view having a length within a range which is equal to or less than the total length in the length direction of the lamp tube or equal to or less than the total length in the circumferential direction and equal to or greater than the total length in the length direction of a low-temperature region of the lamp tube or equal to or greater than the total length in the circumferential direction a low-temperature region of the lamp tube and having a width within a range which is equal to or greater than ⅕ of the outer circumference of the lamp tube in a cross-sectional view and equal to or less than ½ thereof and receives light from a rear surface of the lamp tube and generates an electromotive force; a transparent heat-resistance layer that is stacked on a light-receiving surface of the solar panel and that is disposed behind the lamp tube so that the transparent heat-resistance layer is attached to the rear surface of the lamp tube or the light-receiving surface has a distance of 10 mm or less from the rear surface of the lamp tube; and a power supply line that outputs the electromotive force of the solar panel, in which electric energy of illumination is able to be effectively used to generate a sufficient electromotive force (PCT/JP2011/59364).

However, the above-mentioned power-generating lamp is produced as a completed product and is provided to markets by a manufactory. User has to purchase the power-generating lamp as a completed product and has to replace an existing fluorescent lamp or LED lamp with the power-generating lamp.

Therefore, if the user can simply attach a solar panel to an existing fluorescent lamp or LED lamp in a household or a store to construct a power-generating lamp, spread of the power-generating lamp can be expected.

The present invention is made in consideration of the above-mentioned circumstances and an object thereof is to provide a solar panel device which can be simply attached to an existing fluorescent lamp or LED lamp to construct a power-generating lamp.

Solution to Problem

Therefore, according to an aspect of the present invention, there is provided a solar panel device which is attached to a lamp tube of a linear fluorescent lamp having high-temperature regions on both sides and a low-temperature regions between the high-temperature regions or a lamp tube of a linear LED lamp having a low-temperature region as a whole to construct a power-generating lamp, comprising:
one or a plurality of solar panels that have an arc band-like shape in a cross-sectional view, have an arc length in range which is equal to or greater than ⅕ of an outer circumference of the lamp tube in a cross-sectional view and equal to or less than ½ of the outer circumference in a width direction, receive light from a rear surface of lamp tube and generate an electromotive force;
a power supply line that outputs the electromotive force of the solar panel; and
a tubular base holder that has a tube shape, has the solar panel attached to an inner surface or an outer surface thereof in a length direction, is externally fitted to the lamp tube to cover the lamp tube, holds the solar panel so that a light-receiving surface of the solar panel comes in contact with the surface of the lamp tube or is located with a gap of 10 mm or less from the surface of the lamp tube.

One feature of the present invention is that a solar panel having an arc band-like shape in a cross-sectional view is attached to a tubular base holder and a lamp tube of a fluorescent lamp or an LED lamp is covered with the tubular base holder, so that a part or all of the light-receiving surface of the solar panel is brought in close contact with the lamp tube or the light-receiving surface of the solar panel faces the lamp tube with a distance of 10 mm or less from the surface of the lamp tube. Accordingly, it is possible to secure a sufficient electromotive force of the solar panel and to construct a power-generating lamp by only covering a lamp tube of an existing illumination lamp with the tubular base holder, thereby expecting more spread of the power-generating lamp.

The magnitude of the electromotive force of the solar panel is inversely proportional to the square of a distance from a light source. In the present invention, the distance between the light-receiving surface of the solar panel and the lamp tube is 10 mm or less, which is smaller in comparison with PTL 1 and PTL 2, thereby generating a large electromotive force by the use of the solar panel.

When the solar panel employs a flexible substrate such as a film substrate, the solar panel can be extended to be flat at the time of transport and can be bent in an arc shape in a cross-sectional view at the time of use. However, when the solar panel employs a solid substrate such as a glass substrate, a plastic substrate, or a metal substrate, it is necessary to bend the solid substrate in an arc band-like shape in a cross-sectional view. In this case, the solar panel having an arc band-like shape in a cross-sectional view is packaged with a large volume, thereby causing an increase in transport cost.

Therefore, in case of a solar panel employing a solid substrate, when plural solar panels (hereinafter, referred to as "unit solar panels") having a flat band-like shape are arranged in a width direction and are connected to be foldable and extendable, the solar panel can be made to be compact so as to facilitate transport thereof at the time of being folded. On the other hand, when the solar panel is extended from the folded state and is changed to a polygonal shape having plural successive sides in a cross-sectional view, it is possible to hold the solar panel so that a part of the light-receiving surface of the solar panel comes in close contact with the surface of the lamp tube and the remaining part of the light-receiving surface is located with a distance of 10 mm or less from the surface of the lamp tube.

According to another aspect of the present invention, there is provided a solar panel device which is attached to a lamp tube of a linear fluorescent lamp having high-temperature regions on both sides and low-temperature between the high-temperature regions or a lamp tube of a straight LED lamp having a low-temperature region as a whole to construct a power-generating lamp, comprising:

one or a plurality of solar panels that are comprised of a plurality of unit solar panels having a flat band-like shape, wherein the unit solar panels are arranged with a size in a range which is equal to or greater than ⅕ of an outer circumference of the lamp tube in a cross-sectional view and equal to or less than ½ of the outer circumference in a width direction and edges of the neighboring unit solar panels are connected so as to be foldable and extendable, receives light from a rear surface of the lamp tube and generates an electromotive force;
    a power supply line that outputs the electromotive force of the solar panel;
and
    a tubular base holder having a tube shape that has a plurality of unit solar panels, which are extended from a folded state and are changed to a polygonal shape having plural successive sides in a cross-sectional view, attached to an inner surface or an outer surface thereof in a length direction, is externally fitted to the lamp tube to cover the lamp tube, holds the solar panel so that a part of a light-receiving surface of each unit solar panel comes in contact with the surface of the lamp tube and the remaining part of the light-receiving surface is located with a distance of 10 mm or less from the surface of the lamp tube or so that the light-receiving surface of each unit solar panel is located with a gap of 10 mm or less from the surface of the lamp tube.

When the solar panel comes close to or comes in contact with the lamp tube, the temperature of the solar panel may rise due to emission of heat from the lamp tube and performance of the solar panel may be lowered, thereby lowering power generation efficiency. In case of a fluorescent lamp, a high-temperature region in which a filament is formed has high temperatures of about 65° C. to 75° C. and a region between the high-temperature regions has relatively low temperatures of 38° C. to 40° C. It has been confirmed by experiments of the inventors of the present invention that the performance of the solar panel is hardly lowered at such temperatures.

At the time of filing the PCT patent application (PCT/JP2011/59364) previously filed by the applicants of the present invention, heat resistance of a commercially-available solar panel was not satisfactory. Accordingly, in the invention of the previous PCT patent application, a transparent heat-resistance layer such as a transparent heat-resistance glass layer or a transparent heat-resistance plastic layer is stacked on the light-receiving surface of the solar panel. Thereafter, a solar panel having heat resistance with a heat-resistance temperature of 50° C. or higher has been put into practical use and provided. Therefore, the present invention does not particularly describe a transparent heat-resistance layer, but a transparent heat-resistance layer may be disposed on the light-receiving surface of the solar panel when heat resistance is worried.

An illumination lamp appliance using LEDs is put into practical use and there is a tendency that LED lamp is employed instead of a fluorescent lamp. In a commercially-available LED lamp, LEDs are faced down for the purpose of downward illumination. However, a type of LED lamp in which LEDs are faced up so as not to form a large dark shade behind the LED lamp tube has been recently proposed and put into practical use. By disposing the solar panel in the lamp tube such a type of LED lamp, it is possible to construct the power-generating lamp according to the present invention.

The inventor of the present invention measured the temperature of the LED lamp and found that a low-temperature region of 40° C. or lower is present over the total length of the lamp tube. Therefore, the lamp tube of the LED lamp has a low-temperature region over the total length.

When the solar panel is provided on the rear side of the lamp tube, the solar panel needs to receive a sufficient amount of illumination light, and it is necessary to prevent a reduction in brightness of illumination light which is emitted downward due to solar panel. Therefore, the width of the solar panel having a polygonal band-like shape in a cross-sectional view is set to an arc length in a range which is equal to or greater than ⅕ and equal to or less than ½ of the outer circumference of the lamp tube of an illumination lamp such as a fluorescent lamp or an LED lamp in a cross-sectional view, and is set to a size in a range which is equal to or greater than ⅕ and equal to or less than ½ of the outer circumference of the lamp tube in a cross-sectional view when a solar panel of which a polygonal shape in a cross-sectional view has a plurality of successive sides and is extended to be flat. For example, since the outer circumference of a commercially-available fluorescent lamp or LED lamp in a cross-sectional view is about 9.0 cm, the arc length or the width can be set to be equal to or greater than 2.0 cm and equal to or less than 4.5 cm. However, when a dark shade is formed behind the illumination lamp tube and the area of the shade is large to cause an uncomfortable feeling, the arc length or the width of the solar panel can be preferably set to ⅓ of the outer circumference of the lamp tube in a cross-sectional view, for example, a size of about 3.0 cm in use for a fluorescent lamp of about 9.0 cm.

There are various types of solar panels such as a monocrystalline silicon panel, a polycrystalline silicon panel, a thin-film silicon panel, a compound-based panel, a dye-sensitized panel, an organic thin-film panel, and a quantum-dot panel and any thereof can be employed as the solar panel.

In the above-mentioned aspects, the solar panel having an arc shape in a cross-sectional view or the solar panel changed to a polygonal shape having plural successive sides in a cross-sectional view is attached to the inner surface or the outer surface of the tubular base holder, but a plurality of band-like solar panels may be arranged with a distance each other and attached to the inner surface or the outer surface of the tubular base holder.

According to further another aspect of the present invention, there is provided a solar panel device which is attached to a lamp tube of a linear fluorescent lamp having high-temperature regions on both sides and a low-temperature region between the high-temperature regions or a lamp tube of a linear LED lamp having a low-temperature region as a whole to construct a power-generating lamp, comprising:

one or a plurality of solar panels that have a plurality of unit solar panels having a band-like shape or an arc band-like shape, receives light from a rear surface of the lamp tube and generates an electromotive force;

a power supply line outputs the electromotive force of the solar panel; and a tubular base holder that has a plurality of unit solar panels, which extend in a length direction, arranged on and attached to an inner surface or an outer surface thereof in a width direction with a width in a range which is equal to or greater than ⅕ of an outer circumference of the lamp tube in a cross-sectional view and equal to or less than ½ of the outer circumference, is externally fitted to the lamp tube to cover the lamp tube, holds the solar panel so that a part of a light-receiving surface of each unit solar panel comes in contact with the surface of the lamp tube and the remaining part of the light-receiving surface is located with a gap of 10 mm or less from the surface of the lamp tube or so that the light-receiving surface of each unit solar panel is located with a gap of 10 mm or less from the surface of the lamp tube.

When the fluorescent lamp or the LED lamp is used only as a power-generating lamp and is not used for illumination, the solar panel may cover the total circumference of the lamp tube to enhance the electromotive force.

According to another aspect of the present invention, there is provided a solar panel device which is attached to a lamp tube of a linear fluorescent lamp having high-temperature regions on both sides and a low-temperature region between the high-temperature regions or a lamp tube of a linear LED lamp having a low-temperature region as a whole to construct a power-generating lamp, comprising:

one or a plurality of solar panels have a circular tube shape or a polygonal tube shape, receive light from a surface of the lamp tube and generate an electromotive force;

a tubular base holder that has a circular tube shape or an elliptical tube shape, has the solar panel attached to an inner surface or an outer surface thereof in a length direction, is externally fitted to the lamp tube to cover the lamp tube, holds the solar panel so that a light-receiving surface of the solar panel comes in contact with the surface of the lamp tube or is located with a gap of 10 mm or less from the surface of the lamp tube; and a power supply line that outputs the electromotive force of the solar panel.

In the unit solar panel, a solar cell module may be mounted on a flexible substrate or a solar cell module may be mounted on a solid substrate.

In the above-mentioned aspects, the solar panel is attached to the lamp tube using the tubular base holder, but it is possible to attach the solar panel to the lamp tube without using the tubular base holder by producing the solar panel itself in a tube shape.

Therefore, according to another aspect of the present invention, there is provided a solar panel device which is attached to a linear fluorescent lamp having high-temperature regions on both sides and a low-temperature region between the high-temperature regions or a lamp tube of a linear LED lamp having a low-temperature region as a whole to construct a power-generating lamp, comprising:

one or a plurality of solar panels that have a circular tube shape, an elliptical tube shape, or a polygonal tube shape with an inner diameter, is externally fitted to the lamp tube to cover the lamp tube so that a light-receiving surface thereof comes in contact with the surface of the lamp tube or is located with a distance of 10 mm or less from the surface of the lamp tube, receives light from the lamp tube and generates an electromotive force; and a power supply line that outputs the electromotive force of the solar panel.

The solar panel having a circular tube shape or an elliptical tube shape may be constructed by using a solar panel in which a solar cell module mounted on a band-like flexible substrate, bending the solar panel in the circular tube shape or the elliptical tube shape, and holding the circular tube shape or the elliptical tube shape by using an adhesive tape or a jig.

A solid substrate such as a glass substrate or a plastic substrate may be shaped in a circular tube shape or an elliptical tube shape and a solar cell module may be mounted on the solid substrate to construct a solar panel.

The solar panel having a polygonal tube shape may be constructed by using the unit solar panels in which a solar cell module is mounted on a band-like solid substrate, connecting a plurality of unit solar panels so as to be foldable and extendable, extending and bending the unit solar panels in a polygonal tube shape, and holding the polygonal tube shape with an adhesive tape or a jig.

In the above-mentioned inventions, the solar panel may have a length equal to or less than the length in the length direction of the low-temperature region of the lamp tube, but it is preferable that the solar panel have a length equal to the length in the length direction of the low-temperature region of the lamp tube for the purpose of obtaining a large electromotive force.

When the power-generating lamp is used for illumination, it is preferable that at least a part of the tubular base holder facing a surface of a lower half of the lamp tube in a cross-sectional view be transparent or semitransparent.

In the present invention, the "lamp tube" includes the lamp tubes of both the fluorescent lamp and the LED lamp. The electromotive force of the power-generating lamp can be applied to emission of light in an LED and can be used for a guidance light, or an emergency light, an auxiliary illumination, or a main illumination.

When the low-temperature region of the lamp tube is covered with the tubular solar panel, light from the high-temperature regions on both sides is emitted to the surrounding. According to experiments of the inventor of the present invention, it was confirmed that light from the high-temperature regions on both sides ranged from about 10% to 20% of the total emission intensity of an illumination lamp. Therefore, when the tubular base holder is designed to randomly reflect light, for example, when plural minute protrusions are formed on the inner surface of the tubular base to randomly reflect light, the power-generating lamp can be used for auxiliary illumination.

The material of the tubular base holder is not particularly limited and, for example, a soft or hard synthetic resin material, a glass material, a metal material, or combinations thereof such as a combination of a metal material for an upper half of the tubular base holder and a synthetic resin material for a lower half thereof can be employed. When the solar panel is extended to an arc band-like shape in a cross-sectional view or to a polygonal shape in a cross-sectional view having plural successive sides, it is necessary to make the lower half of the tubular base holder transparent or semitransparent so as to transmit light, thereby not reducing illumination.

When it is necessary to dissipate heat of the solar panel, a heat-dissipating metal foil such as an aluminum foil may be attached to the rear surface of the solar panel or the rear surface of the tubular holder or a rear portion of the tubular holder may be formed of a heat-dissipating metal sheet such as an aluminum sheet.

In recent years, a transparent solar panel transmitting visible rays has been proposed, and the power-generating lamp using the tubular solar panel can be utilized for an illumination lamp or an auxiliary illumination by employing the transparent solar panel as the solar panel having a circular tube shape, an elliptical tube shape, or a polygonal tube shape.

When the transparent solar panel is used as the solar panel having an arc band-like shape in a cross-sectional view or the solar panel of which a polygonal shape in a cross-sectional view has a plurality of successive sides, illumination light can reach the back of the lamp tube, thereby suppressing darkening of the back of the lamp tube.

DESCRIPTION OF EMBODIMENTS

Figure 1:
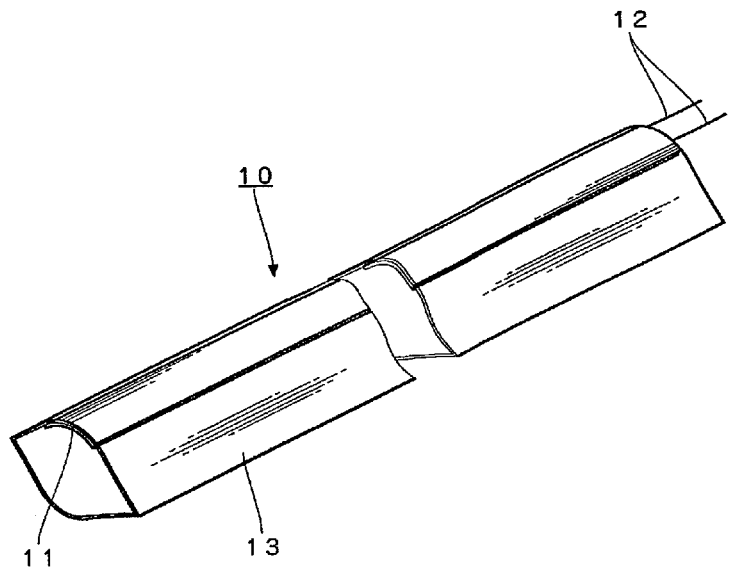
FIG. 1 is a perspective view schematically illustrating a solar panel device according to an embodiment of the present invention.
Figure 2:
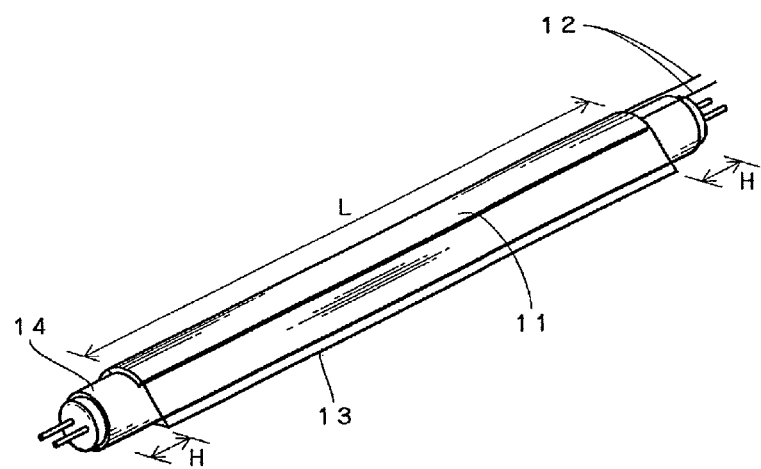
FIG. 2 is a perspective view schematically illustrating a usage example of the embodiment.
Figure 3:
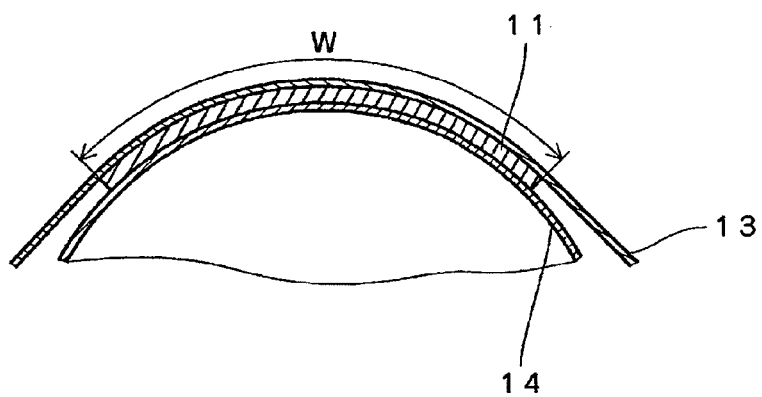
FIG. 3 is a cross-sectional view illustrating a principal part of FIG. 2.

Hereinafter, the present invention will be described in detail with reference to a specific example illustrated in the accompanying drawings. FIGS. 1 to 3 illustrate a solar panel device according to an exemplary embodiment of the present invention. The solar panel device 10 covers a lamp tube 14 of a linear fluorescent lamp substantially over the entire length of a low-temperature region L thereof, receives light from the rear surface of the lamp tube 14, and generates an electromotive force.

The solar panel device 10 has a configuration in which a solar panel 11 is attached to the inner surface of a tubular base holder 13 with an adhesive or the like. The solar panel 11 forms an arc band-like shape in a cross-sectional view having a length 900 mm substantially equal to the length of the low-temperature region L of the lamp tube 14 and an arc length W30 mm which is about ⅓ of the outer circumference of the lamp tube 14 in a cross-sectional view, the light-receiving surface thereof is held in a state where it comes in contact with the rear surface of the lamp tube 14, and the tubular holder 13 has a tube shape with an inner diameter into which the lamp tube 14 with a length of 900 mm and an outer diameter of 90 mm can be inserted.

The solar panel 11 has a configuration in which the solar cell modules are mounted on a band-like flexible substrate such as a film substrate, the electromotive force of the solar panel 11 is output via a power supply line 12, and the solar panel 11 is attached to the inner surface of the tubular holder 13 by using an adhesive or the like and is bent in an arc band shape in a cross-sectional view.

On the other hand, the tubular base holder 13 has a configuration in which both edges of two band-like flexible sheets are fixed to each other by thermal compression or the like and the two band-like sheets are formed of a soft resin material such as a polyethylene resin or a polystyrene resin so as to be transparent or semitransparent. When high heat dissipation performance is requested, a heat-dissipation aluminum foil may be attached to an upper band-like sheet of the tubular base holder 13, an aluminum foil may be attached to the top surface of the solar panel 11 in addition to the aluminum foil of the upper band-like sheet and then the solar panel 11 may be attached to the inner surface of the tubular holder 13, or the upper band-like sheet itself of the tubular holder 13 may be formed of an aluminum sheet.

A fluorescent lamp has high-temperature regions H of temperatures of about 68° C. to 72° C. due to emission of heat from a filament in portions H within about 10 mm from both caps of the lamp tube 13 at the time of turning on the fluorescent lamp and a low-temperature region L of temperatures of about 38° C. to 39° C. between the high-temperature regions H.

Figure 4:
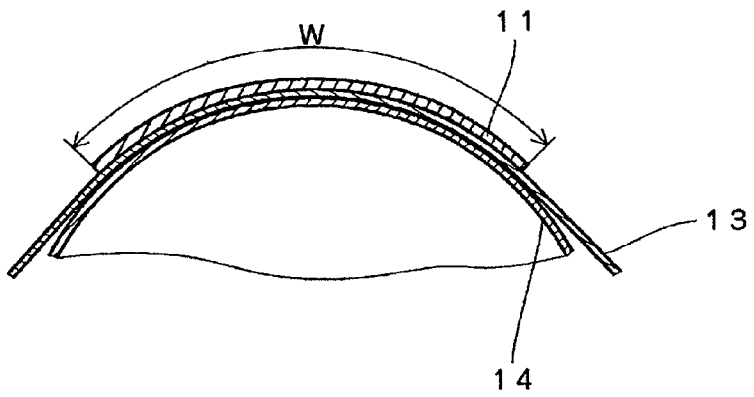
FIG. 4 is a cross-sectional view of a principal part illustrating a usage example of the second embodiment.

FIG. 4 illustrates the second embodiment of the present invention. In the drawing, the same reference numerals as in FIGS. 1 to 3 represent identical or corresponding elements. In this embodiment, the solar panel 11 is attached to the outer surface of the tubular base holder 13 in the length direction by using an adhesive or the like and is held by the tubular base holder 13 so that the light-receiving surface of the solar panel 11 is located with a distance of 10 mm or less from the surface of the lamp tube 14 of the fluorescent lamp.

Figure 5:
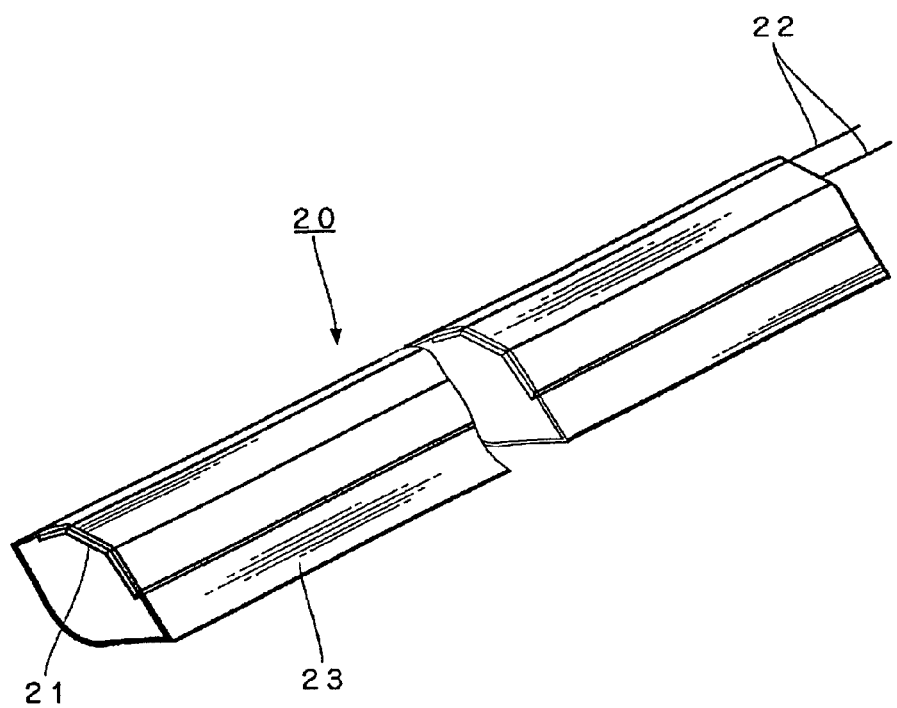
FIG. 5 is a perspective view schematically illustrating the third embodiment.
Figure 6:
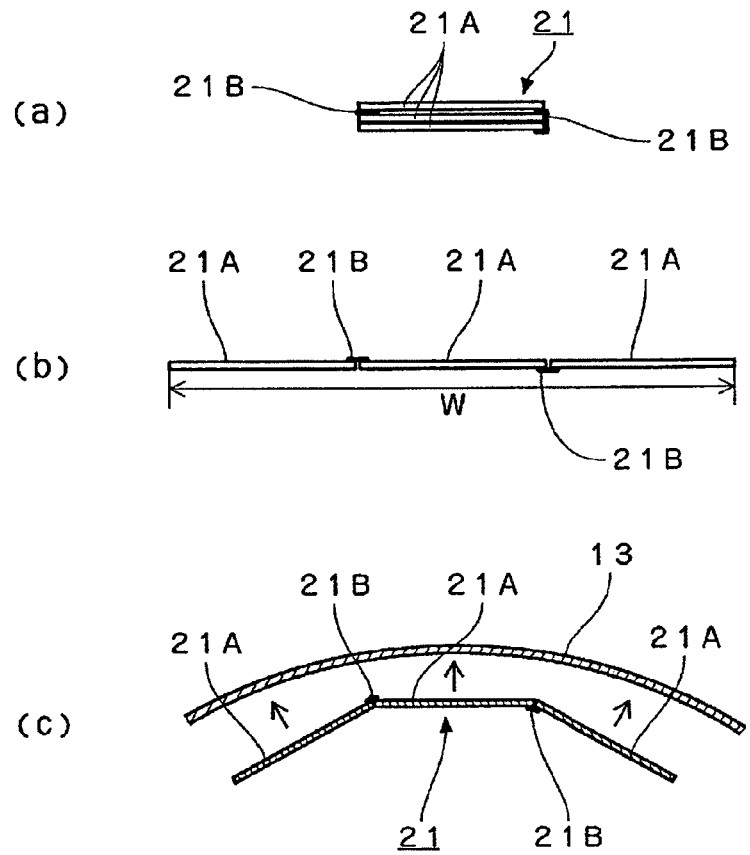
FIG. 6(a) is a diagram illustrating a state where a solar panel is folded in the embodiment.
FIG. 6(b) is a diagram illustrating a state where the solar cell is extended.
FIG. 6(c) is a diagram illustrating a state where the solar panel is attached to a tubular base holder.
Figure 7:
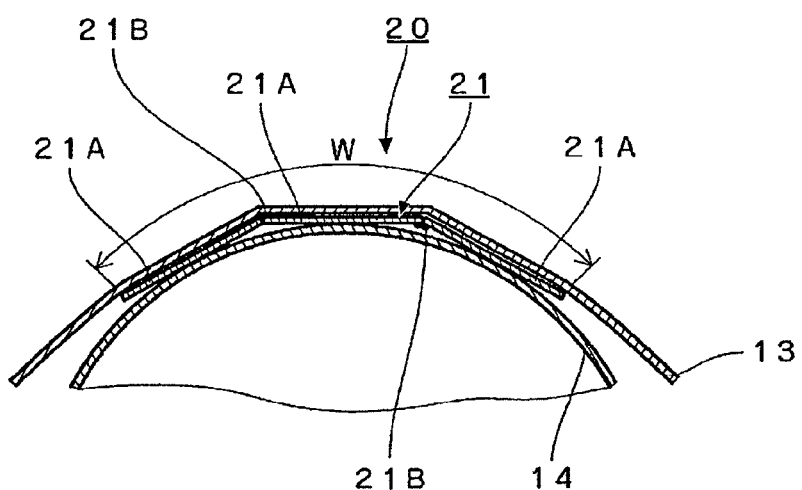
FIG. 7 is a cross-sectional view of a principal part illustrating a usage example of the embodiment.

FIGS. 5 to 7 illustrate the third embodiment of the present invention. In the drawing, the same reference numerals as in FIGS. 1 to 3 represent identical or corresponding elements. In this embodiment, the solar panel device 20 comprises three unit solar panels 21A being changed to a polygonal shape having three successive sides in a cross-sectional view and attached to the inner surface of the tubular base holder 23 in the length direction, and are held by the tubular base holder 23 so that the center portion of light-receiving surface of three unit solar panels 21A come in close contact with the rear surface of lamp tube 14 and the remaining portion of the light-receiving surface thereof are located with a distance of 10 mm or less from the surface of the lamp tube 14.

The unit solar panel 21A comprises one or a plurality of solar cell modules mounted on a band-like solid substrate such as a glass substrate or a plastic substrate, the three unit solar panels 21A are arranged with a size W in a range which is equal to or greater than ⅕ of an outer circumference of the lamp tube in a cross-sectional view and equal to or less than ½ of the outer circumference in a width direction and edges of the neighboring unit solar panels 21A are connected by using a resin tape 21B so as to be foldable and extendable, a power supply line 22 outputs an electromotive force generated by the solar panel 21.

Figure 8:
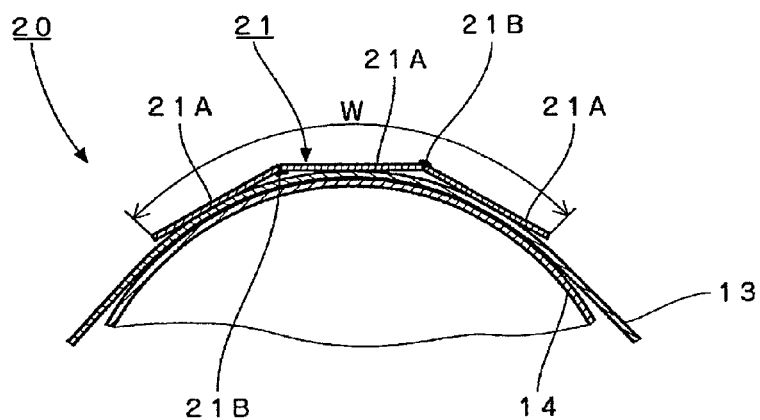
FIG. 8 is a cross-sectional view of a principal part illustrating a usage example of the fourth embodiment.

FIG. 8 illustrates the forth embodiment of the present invention. In the drawing, the same reference numerals as in FIGS. 5 to 7 represent identical or corresponding elements. In this embodiment, the solar panel device 20 comprises three unit solar panels 21A being changed to a polygonal shape having three successive sides in a cross-sectional view and attached to the outer surface of the tubular holder 23 in the length direction, and are held by the tubular base holder 23 so that the light-receiving surface of the unit solar panels 21A is located with a distance of 10 mm or less from the surface of the lamp tube 14, that is, is located at a distance of only thickness of the tubular holder 23.

Figure 9:
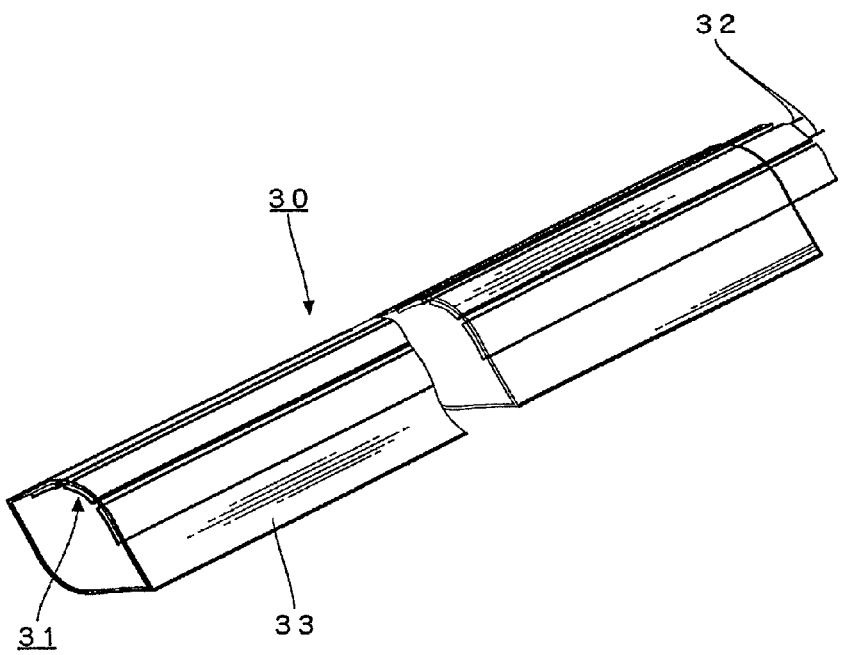
FIG. 9 is a perspective view schematically illustrating the fifth embodiment.
Figure 10:
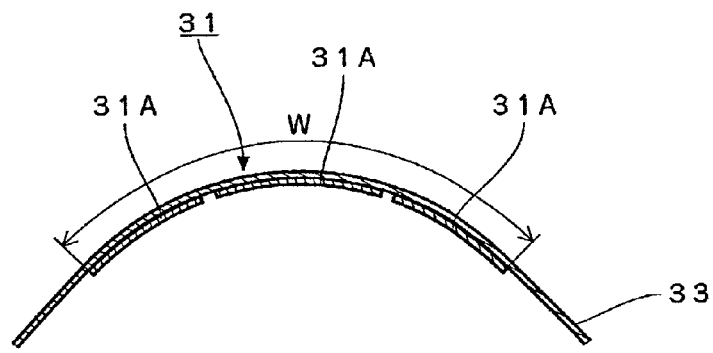
FIG. 10 is a cross-sectional view of a principal part illustrating a usage example of the embodiment.

FIGS. 9 to 10 illustrate the fifth embodiment of the present invention. In the drawing, the same reference numerals as in FIGS. 1 to 3 represent identical or corresponding elements. In this embodiment, the solar panel device 30 comprises three unit solar panels 31A being arranged on an inner surface of the tubular base holder 33 in a width direction with a width in a range which is equal to or greater than ⅕ of an outer circumference of the lamp tube in a cross-sectional view and equal to or less than ½ of the outer circumference with a distance each other, being attached to the inner surface of the tubular base holder 33 in the length direction by using an adhesive, a power supply line 32 outputs an electromotive force generated by the solar panel 31A.

The unit solar panel 31A comprises one or a plurality of solar cell modules mounted on a flexible substrate, the three unit solar panels 31A are held by the tubular base holder 33 so that the light-receiving surface of the unit solar panels 31A comes in close contact with the rear surface of the lamp tube 12. It is possible to employ the unit solar panel comprised one or a plurality of solar cell modules mounted on a solid substrate. In this case, the three unit solar panels 31A are held by the tubular base holder 33 so that the center portion of light-receiving surface of three unit solar panels 31A come in close contact with the rear surface of lamp tube 14 and the remaining portion of the light-receiving surface thereof are located with a distance of 10 mm or less from the surface of the lamp tube 14.

Figure 11:
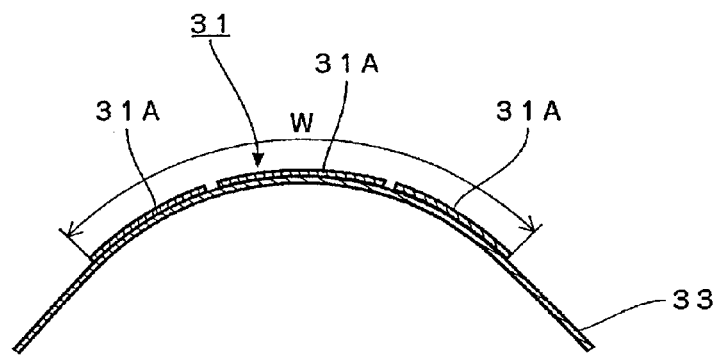
FIG. 11 is a cross-sectional view of a principal part illustrating a usage example of the sixth embodiment.

FIG. 11 illustrates the sixth embodiment of the present invention. In the drawing, the same reference numerals as in FIGS. 9 to 10 represent identical or corresponding elements. In this embodiment, the solar panel device 30 comprises three unit solar panels 31A being arranged on an outer surface of the tubular base holder 33 in a width direction with a width in a range which is equal to or greater than ⅕ of an outer circumference of the lamp tube in a cross-sectional view and equal to or less than ½ of the outer circumference with a distance each other, being attached to the outer surface of the tubular base holder 33 in the length direction by using an adhesive, and are held by the tubular holder 33 so that the light-receiving surface of the unit solar panels 31A is located with a distance of 10 mm or less from the surface of the lamp tube 14, that is, is located at a distance of only thickness of the tubular base holder 33.

Figure 12:
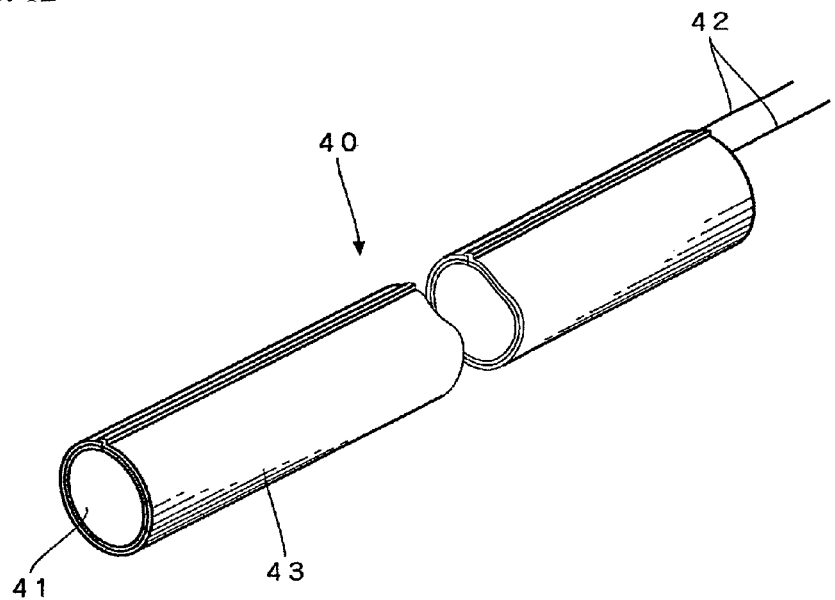
FIG. 12 is a perspective view schematically illustrating the seventh embodiment.
Figure 13:
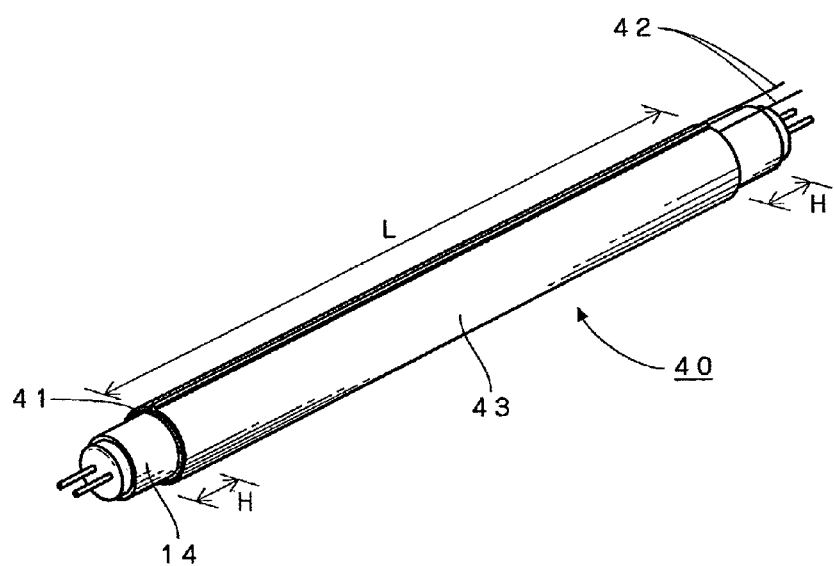
FIG. 13 is a perspective view schematically illustrating a usage example of the embodiment.
Figure 14:
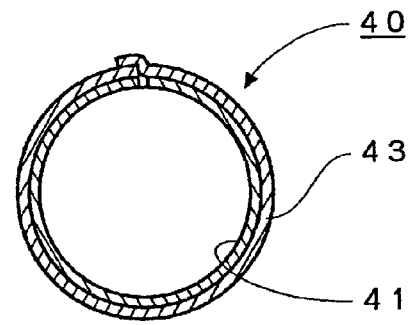
FIG. 14 is a cross-sectional view of a principal part illustrating the embodiment.

FIGS. 12 to 14 illustrate the seventh embodiment of the present invention. In this embodiment, the solar panel device 40 comprises a solar panel 41 having a circular tube shape is attached an inner surface of a tubular base holder 43 having a circular tube shape by using an adhesive, the solar panel 41 comprised one or a plurality of solar cell modules mounted on a flexible solid substrate, a power supply line 42 outputs an electromotive force generated by the solar panel 41. The tubular holder 43 is made by one flexible band-like sheet which both sides thereof are piled on and attached each other by using a heat seal means for forming a tubular shape, the flexible band-like sheet is formed by using a material of transparent or semitransparent soft resin such as polyethylene resin or polystyrene resin.

The solar panel device 40 is externally fitted on the lamp tube 14 to cover the low-temperature region L of the lamp tube 14, the solar panel 41 is held by the tubular base holder 43 so as the light-receiving surface of the solar panels 41 comes in close contact with a whole surface of the lamp tube 14 in direction of circumference thereof or is located to face to the surface of the lamp tube 14 with a little gap.

The light from the high-temperature regions H on both sides are utilized for a downward illumination, it is about 10% of the total emission intensity of an illumination lamp. Therefore, when the tubular base holder 43 is designed to randomly reflect light, a plurality of minute protrusions are formed on the inner surface of the both sides of tubular base holder to randomly reflect light, thereby obtain the dim light of lamp illumination.

Figure 15:
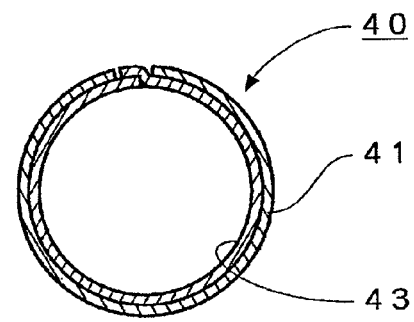
FIG. 15 is a cross-sectional view of a principal part illustrating the eighth embodiment.

FIG. 15 illustrates the eighth embodiment of the present invention. In the drawing, the same reference numerals as in FIGS. 12 to 14 represent identical or corresponding elements. In this embodiment, the solar panel device 40 comprises a solar panel 41 having a circular tube shape, is attached an outer surface of a tubular base holder 43 having a circular tube shape by using an adhesive. The solar panel 41 is comprised one or a plurality of solar cell modules mounted on a flexible substrate. The solar panel device 40 is externally fitted on the lamp tube 14 to cover the low-temperature region L of the lamp tube 14, the solar panel 41 is held by the tubular holder 43 so as the light-receiving surface of the solar panels 41 comes in close contact with a whole surface of the lamp tube 14 in direction of circumference thereof or is located to face to the surface of the lamp tube 14 with a little gap.

Figure 16:
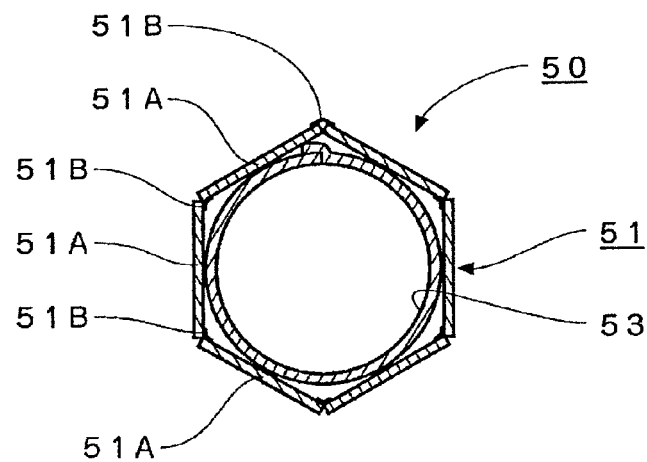
FIG. 16 is a cross-sectional view of a principal part illustrating the ninth embodiment.

FIG. 16 illustrates the ninth embodiment of the present invention. In this embodiment, the solar panel device 50 is comprised the solar panel 51 having a polygonal shape in a cross-sectional view, being attached to the outer surface of tubular holder 53 by using an adhesive, the solar panel 51 is comprised a plurality of unit solar panels 51 are bent in a polygonal shape in a cross-sectional view. The unit solar panel 51A is comprised one or a plurality of solar cell modules mounted on a solid substrate. The unit solar panels 51A are arranged in a width direction, edges of the neighboring unit solar panels 51A are connected by using a resin tape 21B so as to be foldable and extendable, are bent in the polygonal shape and held in the polygonal shape by connecting edges thereof each other with a resin tape 21B.

The solar panel device 50 is externally fitted on the lamp tube 14 to cover the low-temperature region L of the lamp tube 14. The solar panel 51 is held by the tubular base holder 53 so as the light-receiving surface of the solar panels 51 is faced to the surface of the lump tube 14 with a distance of 10 mm or less from a whole surface of the lamp tube 14 in direction of circumference.

Figure 17:
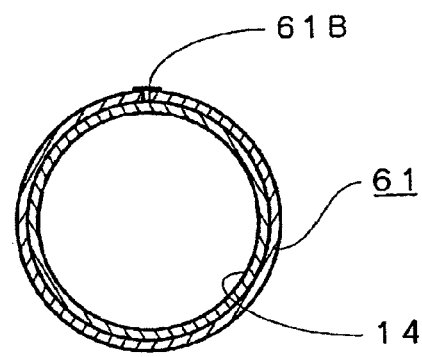
FIG. 17 is a cross-sectional view of a principal part illustrating the tenth embodiment.

FIG. 17 illustrates the tenth embodiment of the present invention. In this embodiment, the solar panel 61 having a tubular shape externally fitted on the lamp tube 14 to cover the low-temperature region L of the lamp tube 14. The solar panel 61 is comprised solar cell modules mounted on a flexible substrate and is bent in tubular form and held in the tubular shape by connecting edges thereof each other with a resin tape 21B, thereby it is possible to form the tubular solar panel device without using the tubular base holder only by bending the solar panel in tubular form in itself.

Figure 18:
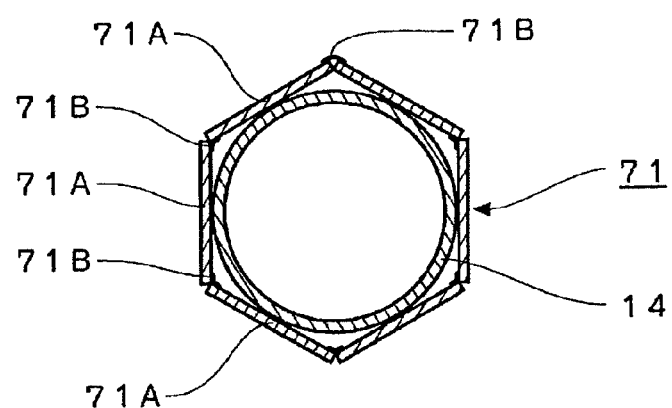
FIG. 18 is a cross-sectional view of a principal part illustrating the eleventh embodiment.

FIG. 18 illustrates the eleventh embodiment of the present invention. In this embodiment, the solar panel 71 having a polygonal shape is externally fitted on the lamp tube 14 to cover the low-temperature region L of the lamp tube 14. The solar panel 71 is comprised a plurality of unit solar panel 71A in polygonal form in a cross-sectional view, the unit solar panel 71A is comprised one or a plurality of solar cell modules mounted on a solid substrate in a flat belt-like shape, the unit solar panels 71A are arranged in a width direction, edges of the neighboring unit solar panels 71A are connected by using a resin tape 71B so as to be foldable and extendable, are bent in the polygonal shape and held in the polygonal shape by connecting edges thereof each other with a resin tape 71B, thereby the solar panel 71 is formed in polygonal tubular with size which the center portion of light-receiving surface of each unit solar panels 71A come in close contact with the rear surface of lamp tube 14 and the remaining portion of the light-receiving surface thereof are located with a distance of 10 mm or less from the surface of the lamp tube 14.

Figure 19:
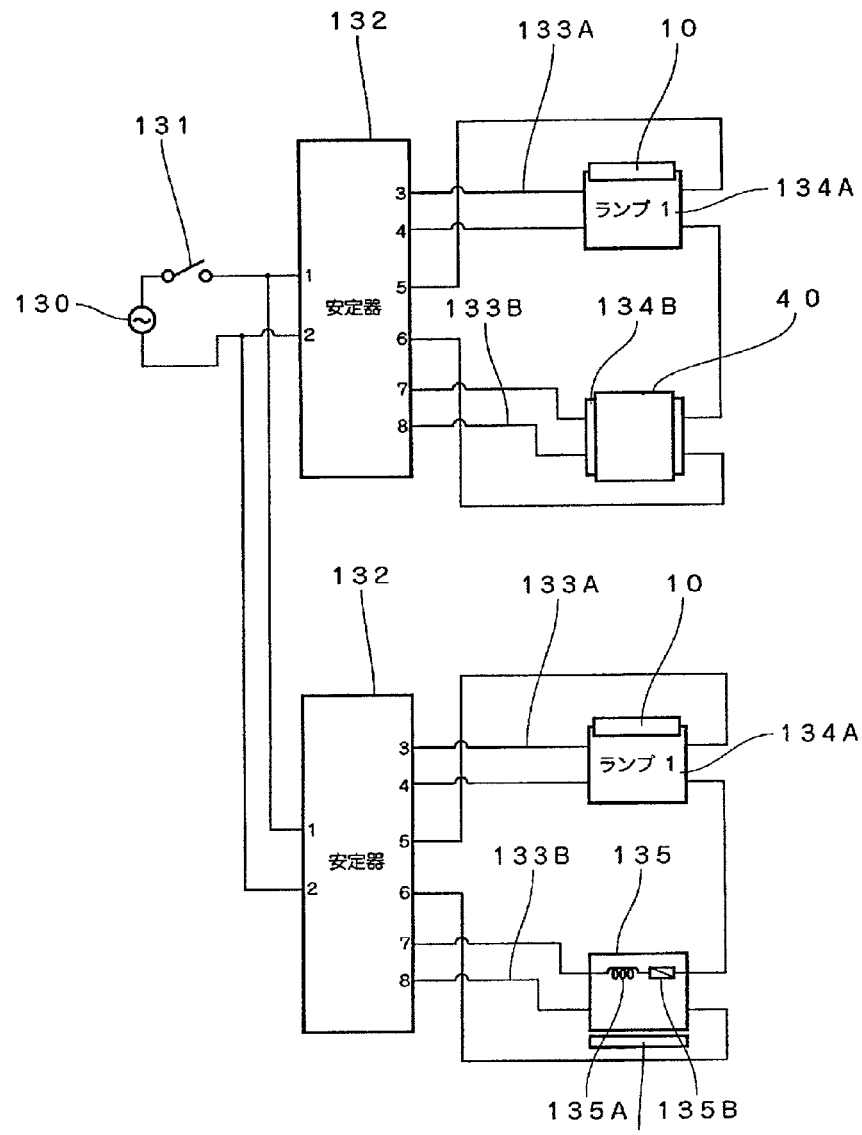
FIG. 19 is a configuration diagram schematically illustrating an example of an illumination mechanism using the embodiment.

In present invention, the illumination appliance may be comprised such as shown in FIG. 19. In FIG. 19, a stabilizer such as an inverter-type stabilizer 132 is operated to be turned on or off by a power supply switch 131, to which an alternating current voltage of a commercial power supply 130 is input, and from which a predetermined high-frequency direct current voltage is output.

Two current-carrying circuits 133A and 133B are connected to output terminals of the inverter-type stabilizer 130 in series to the output terminals and are connected in parallel to each other. The current-carrying circuits 133A and 133B are connected to fluorescent lamps 134A and 134B or a fluorescent lamp 134A and a fluorescent dummy lamp 134B. A solar panel device such as the solar panel device 10 according to the present invention is externally fitted on the lamp tube of fluorescent lamp 134A to cover the low-temperature region L of the lamp tube thereby the first power generating lamp is comprised, a solar panel device such as the solar panel device 40 according to the present invention is externally fitted on the lamp tube of fluorescent lamp 135 to cover the low-temperature region L of the lamp tube thereby the second power generating lamp is comprised.

Figure 20:
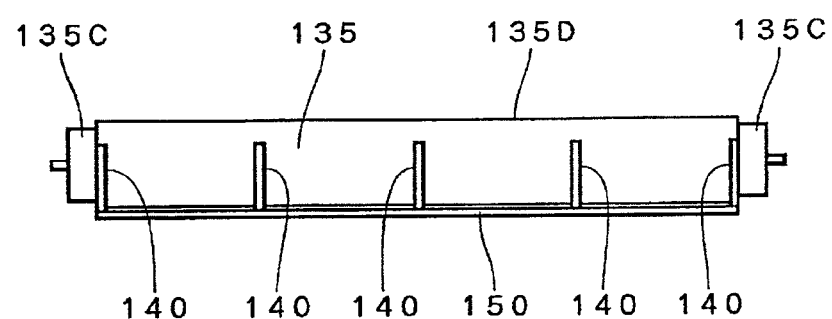
FIG. 20 is a side view illustrating a dummy tube of a fluorescent lamp in the embodiment.

The fluorescent lamp dummy tube 35 has a structure as shown in FIG. 20 in which caps 135C are fixed to both ends of a tube 135D made of heat-resistant plastic, a conductor connects the caps 135C, and an inductor 135A, which is a predetermined resistive component, and a fuse 25B are connected to the conductor.

Figure 21:
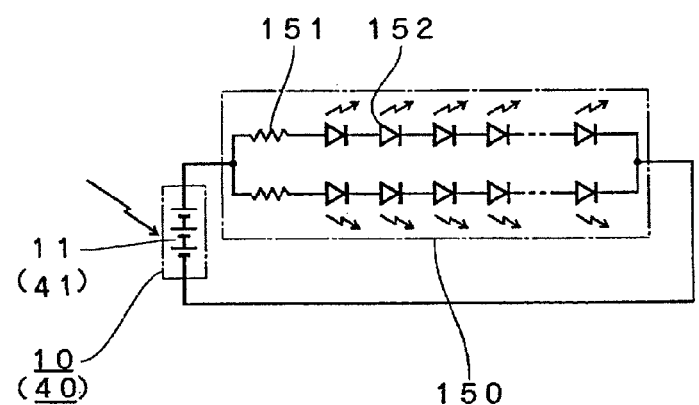
FIG. 21 is a circuit diagram illustrating an example of an LED circuit in the embodiment.

An LED circuit 150 is attached to the lower surface of the fluorescent lamp dummy tube 135 by a plurality of C-shaped clips 140. As shown in FIG. 21, the LED circuit 150 has a structure in which two series circuits of a resistor 151 and a plurality of LEDs 152 are connected in parallel to each other. The LED circuit 150 is turned on by power generated by the fluorescent lamp 134A, 134B which serves as a power supply. In this way, the fluorescent lamp dummy tube 25 can be used for illumination.

Figure 22:
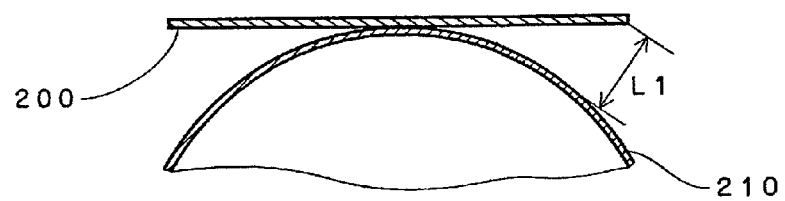
FIG. 22 is a diagram schematically illustrating a method of measuring an electromotive force of a power-generating lamp.

The power generation capability of the power generating lamp according to the invention was measured and compared with that of photovoltaic power generation. A solar panel 200 shown in FIG. 22 was used to measure the power generation capability. The solar panel 200 is a flat panel with a width of 30 mm and a length of 950 mm and has a linear shape in a cross-sectional view. In addition, one lamp of two type lamps with an electronic ballast Hf32W was used and set such that the center of surface of the solar panel 200 comes into contact with the rear surface of the lamp and a distance L1 from the rear surface of the lamp tube 210 to both ends of the solar panel was equal to or less than 10 mm.

A Hioki voltammeter was used for measurement and four resistors with a resistance of 20 K (were connected in parallel to the output terminal of the solar panel 200 to measure a current and a voltage. In order to measure the photovoltaic power generated, the same solar panel 200 was used to receive direct rays from the clear sky at 2 p.m., Mar. 24, 2011 and the voltage and current of the solar panel 200 were measured.

In the case of power generation using the lamp, when the voltage was 42.7V and the current was 8.7 mA, the amount of power generated per hour was 371 mW. In contrast, in the case of photovoltaic power generation, when the voltage was 60V and the current was 12 mA, the amount of power generated per hour was 720 mW. In the case of power generation using a lamp, power generation conditions are constant throughout the year. However, in the case of photovoltaic power generation, it is assumed that the amount of power generated per hour is 360 mW since power generation is unavailable for at least half a year due to the cloudy and rainy weather.

In addition, in the case of power generation using the lamp, the power generation conditions are constant throughout 24 hours. However, in the case of photovoltaic power generation, the position of the sun varies over time and the incident angle of light on the solar panel 11 is changed. It is assumed that average power generation efficiency is about 70%. Therefore, the amount of power generated per hour is 252 mW.

Furthermore, in the case of power generation using the lamp, when the fluorescent lamp is turned on for 24 hours, it is possible to generate power for 24 hours and the amount of power generated per day is 8904 mW. However, in the case of photovoltaic power generation, the average annual daylight hours are 8 and the amount of power generated per day is 2016 mW.

As can be seen from the above, the power generation system using the lamp according to the invention can have the greater power generation efficiency than the photovoltaic power generation system as long as it can ensure a sufficiently large area of the solar panel using a large number of fluorescent lamps or LED lamps.

Figure 23:
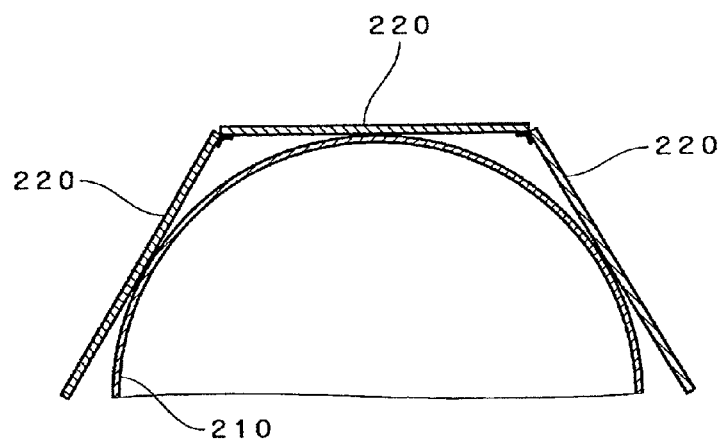
FIG. 23 is a diagram schematically illustrating another method of measuring an electromotive force of a power-generating lamp.

Furthermore the power generation capability of the power generating lamp according to the invention was measured. A solar panel 220 having three solar panels shown in FIG. 23 was used to measure the power generation capability. The solar panel 220 has a width of 20 mm and a characteristics as same as the solar panel shown in FIG. 22. As a result of measurement, it is found that the solar panel device shown in FIG. 23 having three solar panels has five times of power generation comparing to that of the solar panel device shown in FIG. 22.

In above example, power generated of the first and second power generation lamps are use for the fluorescent dummy lamp to emit light, it is possible the LED circuit 150 to main illumination appliance by being applied other portion.

REFERENCE SIGNS LIST 10, 20, 30, 40, 50, 60, 70 Solar panel device
11, 21, 31, 41, 51, 61, 71 Solar panel
21A, 31A, 41A, 51A, 61A, 71A Unit solar panel
12, 22, 32, 42 Power supply line
14 Lamp tube

The invention claimed is:

1. A solar panel device which is attached to a lamp tube of a liner fluorescent lamp having high-temperature regions on both sides and a low-temperature region between the high-temperature regions or a lamp tube of a linear LED lamp having a low-temperature region as a whole to construct a power-generating lamp, comprising:
one or more solar panels for receiving light from a rear surface of the lamp tube to generate an electromotive force; which have an arc band-like shape in a cross-sectional view with an arc length in a range of ⅕ to ½ of an outer circumference of the lamp tube in a cross-sectional view,
a power supply line for outputting the electromotive force of the solar panel; and
a tubular base holder that has a tube shape with a length range from the same longitudinal length of the low-temperature region of the lamp tube to the total longitudinal length of the lamp tube, in which the solar panel is attached to an inner or outer surface thereof in a length direction, the tubular base holder being externally fitted to the lamp tube to cover the lamp tube, and to hold the solar panel so that a light-receiving surface of the solar panel comes in contact with the surface of the lamp tube or is located with a distance of 10 mm or less from the surface of the lamp tube, wherein a plurality of minute protrusions are formed in the surface of tubular base holder and light from the high-temperature regions on both sides of the lamp tube is randomly reflected by the plurality of minute protrusions.

2. The solar panel device according to claim 1, wherein at least a part of the tubular base holder facing a lower half surface of the lamp tube in a cross-sectional view is transparent or semi-transparent.

3. A solar panel device which is attached to a lamp tube of a linear fluorescent lamp having high-temperature regions on both sides and a low-temperature region between the high-temperature regions or a lamp tube of a linear LED lamp having a low-temperature region as a whole to construct a power-generating lamp, comprising:
one or more solar panels for receiving light from a rear surface of the lamp tube to generate an electromotive force, which comprise a plurality of unit solar panels having a flat band-like shape, wherein the unit solar panels are arranged with a size range of ⅕ to ½ of an outer circumference of the lamp tube in a cross-sectional view, and edges of the neighboring unit solar panels are connected so as to be foldable and extendable,
a power supply line that outputs the electromotive force of the solar panel; and
a tubular base holder having a tube shape in which the plurality of unit solar panels are arranged in a folded manner to form a part of polygonal shape and are attached to an inner surface or an outer surface thereof in a length direction, the tubular base holder being externally fitted to cover the lamp tube, and holds the solar panels so that a part of a light-receiving surface of each unit solar panel comes in contact with the surface of the lamp tube and the remaining portion of the light-receiving surface is located with a distance of 10 mm or less from the surface of the lamp tube or so that the light-receiving surface of each unit solar panel is located with a distance of 10 mm or less from the surface of the lamp tube.

4. A solar panel device which is attached to a lamp tube of a liner fluorescent lamp having high-temperature regions on both sides and a low-temperature region between the high-temperature regions or a lamp tube of a linear LED lamp having a low-temperature region as a whole to construct a power-generating lamp, comprising:
one or more solar panels comprising a plurality of unit solar panels having a band-like shape for receiving light from a rear surface of the lamp tube to generate an electromotive force;
a power supply line for outputting the electromotive force of the solar panel; and
a tubular base holder having a tube shape wherein the unit solar panels extending in a length direction, are arranged on and attached to an inner surface or an outer surface thereof in a width direction with a width range of ⅕ to ½ of an outer circumference of the lamp tube in a cross-sectional view to cover the lamp tube, and to hold the solar panel so that a part of a light-receiving surface of each unit solar panel comes in contact with the surface of the lamp tube and the remaining part of the light-receiving surface is located with a distance of 10 mm or less from the surface of the lamp tube or so that the light-receiving surface of each unit solar panel is located with a distance of 10 mm or less from the surface of the lamp tube, wherein a plurality of minute protrusions are formed in the surface of tubular base holder and light from the high-temperature regions on both sides of the lamp tube is randomly reflected by the plurality of minute protrusions.

5. A solar panel device which is attached to a linear fluorescent lamp having high-temperature regions on both sides and a low-temperature region between the high-temperature regions or a lamp tube of a linear LED lamp having a low-temperature region as a whole to construct a power-generating lamp, comprising:
one or more solar panels comprising a plurality of unit solar panels which comprise one or a plurality of solar cell modules mounted on a band-like flexible substrate and are connected so as to be tubular shape and are held in the tubular shape by an adhesive tape or a jig for receiving light from a surface of the lamp tube to generate an electromotive force;
a tubular base holder having a circular tube shape or an elliptical tube shape, wherein the solar panel is attached to an inner surface or an outer surface thereof in a longitudinal direction to cover the lamp tube, and the tubular base holder holds the solar panel so that a light-receiving surface of the solar panel comes in contact with the surface of the lamp tube or is located with a distance of 10 mm or less from the surface of the lamp tube; and a power supply line for outputting the electromotive force of the solar panel.

6. A solar panel device which is attached to a linear fluorescent lamp having high-temperature regions on both sides and a low-temperature region between the high-temperature regions or a lamp tube of a linear LED lamp having a low-temperature region as a whole to construct a power-generating lamp, comprising:

one or more solar panel for receiving light from the lamp tube to generate an electromotive force, comprising a plurality of unit solar panels which comprise one or a plurality of solar cell modules mounted on a band-like flexible substrate and are connected so as to be tubular shape and are held in the tubular shape by an adhesive tape or a jig, are externally fitted to the lamp tube to cover the lamp tube so that a light-receiving surface thereof comes in contact with the surface of the lamp tube or is located with a gap of 10 mm or less from the surface of the lamp tube, a power supply line for outputting the electromotive force of the solar panel.

7. A solar panel device which is attached to a lamp tube of a linear fluorescent lamp having high-temperature regions on both sides and a low-temperature region between the high-temperature regions or a lamp tube of a linear LED lamp having a low-temperature region as a whole to construct a power-generating lamp, comprising:

a solar panel comprising a plurality of unit solar panels which comprise a plurality of solar cell modules mounted on a flat band-like solid substrate and are connected so as to be foldable and extendable, and the plurality of unit solar panels are extended in the polygonal tube shape and are held in the polygonal tube shape by an adhesive tape or a jig, and receives light from a rear surface of the lamp tube and generates an electromotive force;

a tubular base holder having a circular tube shape or an elliptical tube shape wherein said solar panels are externally fitted to the lamp tube to cover the lamp tube, so that a light-receiving surface thereof comes in contact with the surface of the lamp tube or is located with a distance of 10 mm or less from the surface of the lamp tube; and a power supply line that outputs the electromotive force of the solar panel.

8. A solar panel device which is attached to a lamp tube of a linear fluorescent lamp having high-temperature regions on both sides and a low-temperature region between the high-temperature regions or a lamp tube of a linear LED lamp having a low-temperature region as a whole to construct a power-generating lamp, comprising:

one or more solar panels for receiving light from a rear surface of the lamp tube to generate an electromotive force, comprising a plurality of unit solar panels which comprises a plurality of solar cell modules mounted on a flat band-like solid substrate, and are connected so as to be foldable and extendable, and the plurality of unit solar panels are extended in the polygonal tube shape and are held in the polygonal tube shape by an adhesive tape or a jig, and are externally fitted to the lamp tube to cover the lamp tube so that a light-receiving surface thereof comes in contact with the surface of the lamp tube or is located with a distance of 10 mm or less from the surface of the lamp tube, and a power supply line that outputs the electromotive force of the solar panel.

* * * * *